United States Patent
O'Neill et al.

(10) Patent No.: US 9,037,302 B2
(45) Date of Patent: May 19, 2015

(54) MODEL BASED SYSTEM AND METHOD FOR ESTIMATING PARAMETERS AND STATES IN TEMPERATURE CONTROLLED SPACES

(75) Inventors: Zheng O'Neill, Vernon, CT (US); Satish Narayanan, Ellington, CT (US); Mathias Diebold, Cologne (DE); Andrzej Banaszuk, Simsbury, CT (US)

(73) Assignee: Carrier Corporation, Farmington, CT (US)

( * ) Notice: Subject to any disclaimer, the term of this patent is extended or adjusted under 35 U.S.C. 154(b) by 359 days.

(21) Appl. No.: 13/515,213

(22) PCT Filed: Feb. 15, 2011

(86) PCT No.: PCT/US2011/024847
§ 371 (c)(1),
(2), (4) Date: Jun. 11, 2012

(87) PCT Pub. No.: WO2011/100736
PCT Pub. Date: Aug. 18, 2011

(65) Prior Publication Data
US 2012/0330465 A1    Dec. 27, 2012

Related U.S. Application Data

(60) Provisional application No. 61/304,613, filed on Feb. 15, 2010.

(51) Int. Cl.
*G05D 23/19*    (2006.01)
*G05B 17/02*    (2006.01)
*F24F 11/00*    (2006.01)

(52) U.S. Cl.
CPC ............. *G05D 23/19* (2013.01); *F24F 11/0012* (2013.01); *F24F 11/006* (2013.01); *F24F 2011/0046* (2013.01); *F24F 2011/0061* (2013.01); *G05B 17/02* (2013.01)

(58) Field of Classification Search
CPC ............... F24F 11/0012; F24F 11/006; F24F 2011/0061; G05D 23/19; G05B 17/02
USPC ................ 700/276–278, 299–300; 62/132, 62/155–157, 231–232; 165/200–201, 218, 165/265; 236/1 B, 1 C, 91 R, 91 D, 91 E
See application file for complete search history.

(56) References Cited

U.S. PATENT DOCUMENTS

| 4,649,711 A |   | 3/1987 | Sibley et al. |
| 4,829,779 A | * | 5/1989 | Munson et al. .................. 62/175 |

(Continued)

FOREIGN PATENT DOCUMENTS

| EP | 2 012 069 A1 | 7/2009 |
| EP | 2012069 A1 | 7/2009 |

OTHER PUBLICATIONS

O'Neill, Zheng et al., "Model-Based Thermal Load Estimation in Buildings", Fourth National Conference of IBPSA-USA, Aug. 11-13, 2010, 474-481.

(Continued)

*Primary Examiner* — Ramesh Patel
(74) *Attorney, Agent, or Firm* — Miller, Matthias & Hull LLP

(57) ABSTRACT

A method for estimating a heating/cooling load of a zone within a building may include determining a measured parameter from the zone, generating a reduced order thermodynamic model of the zone, generating an Extended Kalman Filter based on the thermodynamic model of the zone, and processing the measured parameter using the Extended Kalman Filter to estimate at least one unknown state of the zone, such as an estimated load. A similar method may be used to estimate a temperature in a cold room of a refrigeration system.

12 Claims, 3 Drawing Sheets

(56) References Cited

U.S. PATENT DOCUMENTS

| | | | |
|---|---|---|---|
| 6,863,222 B2 * | 3/2005 | Slifkin et al. | 236/51 |
| 6,892,546 B2 * | 5/2005 | Singh et al. | 62/127 |
| 6,981,385 B2 | 1/2006 | Arshansky et al. | |
| 7,152,415 B2 | 12/2006 | Micak et al. | |
| 7,775,452 B2 * | 8/2010 | Shah et al. | 236/51 |
| 7,905,100 B2 * | 3/2011 | Thybo et al. | 62/129 |
| 8,393,169 B2 * | 3/2013 | Pham | 62/129 |
| 2005/0028539 A1 * | 2/2005 | Singh et al. | 62/127 |
| 2005/0056033 A1 * | 3/2005 | Gingras | 62/129 |
| 2006/0026975 A1 | 2/2006 | Bunch et al. | |
| 2008/0072611 A1 | 3/2008 | Ahmed et al. | |
| 2008/0148751 A1 * | 6/2008 | Swofford | 62/210 |
| 2009/0145144 A1 | 6/2009 | Matsuhashi et al. | |
| 2009/0187445 A1 * | 7/2009 | Barclay et al. | 705/7 |
| 2009/0210102 A1 * | 8/2009 | Thybo et al. | 700/299 |
| 2009/0217684 A1 * | 9/2009 | Ouchi et al. | 62/155 |
| 2009/0235673 A1 | 9/2009 | Lifson et al. | |
| 2013/0245847 A1 * | 9/2013 | Steven et al. | 700/291 |

OTHER PUBLICATIONS

Bianchi, Mikael "Adaptive Modellbasierte Prädiktive Regelung einer Kleinwärmepumpenanlage", 2006.

Usoro, P.B. et al., "HVAC System Fault Detection and Diagnosis", 1985, Scientific Systems, Inc., Cambridge, Massachusetts.

Nakahara, Nobuo, "Load Prediction for Optimal Thermal Storage—Comparison of Three Kinds of Model Application", 1999.

Yoshida, Harunori et al., "Typical Faults of Air-Conditioning Systems and Fault Detection by ARX Model and Extended Kalman Filter", ASHRAE Transactions, 2006, pp. 557-564, vol. 102.

Office Action issued in corresponding Chinese Patent Application No. 201180009750.X; Action dated Aug. 21, 2014.

\* cited by examiner

MODEL BASED SYSTEM AND METHOD FOR ESTIMATING PARAMETERS AND STATES IN TEMPERATURE CONTROLLED SPACES

CROSS-REFERENCE TO RELATED APPLICATION

This application is a 35 USC §371 US National Stage Patent Application of International Patent Application No. PCT/US2011/024847 filed on Feb. 15, 2011, and claiming priority under 35 USC §119(e) to U.S. Provisional Patent Application Ser. No. 61/304,613 filed on Feb. 15, 2010.

TECHNICAL FIELD OF THE DISCLOSURE

The present disclosure generally relates to systems and methods for controlling temperature in an interior space and, more particularly, to systems and methods for estimating parameters related to the heating and/or cooling of an interior space.

BACKGROUND OF THE DISCLOSURE

A variety of systems can be used to control temperature within a given space. HVAC systems, for example, are used to control temperature and other environmental conditions within structures such as residences, office buildings, and manufacturing plants. By way of example, environmental conditions such as temperature, humidity, air purity, air flow, enthalpy (combined value of temperature and humidity), and "fresh air" ventilation can be regulated to ensure that the interior environment of a structure is as desired for particular occupants and equipment housed in the structure, and for processes and procedures conducted within the structure. Similarly, refrigeration systems are used to maintain an interior space, such as a cold room for food storage, at a desired temperature to minimize bacteria growth or other detrimental effects to the contents stored in the space.

Conventional systems used to control temperature of a space are typically limited as to the type of parameters about which feedback is provided. Such systems may include various sensors for detecting parameters, such as temperature, in real time. The number of parameters about which data may be provided, therefore, is typically limited to those parameters that are capable of being directly measured or inferred from such measurements. The limited amount of feedback data, in turn, may limit or prevent the ability to perform certain processes, such as system diagnostics, or materially reduce the precision and accuracy of those processes.

In certain applications, the limited feedback provided by conventional systems may lead to inefficient operation or monitoring of those systems. A supermarket refrigeration system, for example, may have a cold room for storing goods at a controlled temperature. Food quality is of primary importance to the supermarket operation, and therefore the refrigeration system may be continuously monitored to maintain a desired food temperature. In some systems, an alarm may be triggered when the room temperature exceeds a threshold value. An engineer may review alarm conditions to try to determine the root cause of the alarm, such as detecting and diagnosing possible faults in the refrigeration system. Conventional monitoring systems typically use a manual process to determine root causes for alarm signals. For example, an engineer may call the store to determine whether warmer goods were recently brought into the cold room, thereby raising the air temperature of the cold room above the threshold value. Additionally or alternatively, the engineer may wait for a predetermined period of time to see if the air temperature returns to a safe level before determining whether the alarm is true or false. Such delay, however, may adversely affect food quality for an unnecessary period of time.

It would therefore be advantageous if an improved system for predicting cold room temperatures in an interior space is developed.

SUMMARY OF THE DISCLOSURE

A method for estimating a heating/cooling load of a zone within a building may include determining a measured parameter from the zone, generating a reduced order thermodynamic model of the zone, generating an Extended Kalman Filter based on the thermodynamic model of the zone, and processing the measured parameter using the Extended Kalman Filter to estimate at least one unknown state of the zone.

A method for estimating a temperature in a cold room of a refrigeration system may include determining a measured parameter from the cold room, generating a reduced order thermodynamic model of the cold room, the thermodynamic model including at least one unknown parameter, and identifying the at least one unknown parameter of the thermodynamic model using a system identification method and sensor measurement data. An Extended Kalman Filter may be generated based on the thermodynamic model of the cold room, and the measured parameter may be processed using the Extended Kalman Filter to obtain an estimated unknown state of the cold room and to obtain an estimated unknown parameter of the cold room.

These are other aspects and features of the disclosure will become more apparent upon reading the following detailed description when taken in conjunction with the accompanied drawings.

Figure 2:
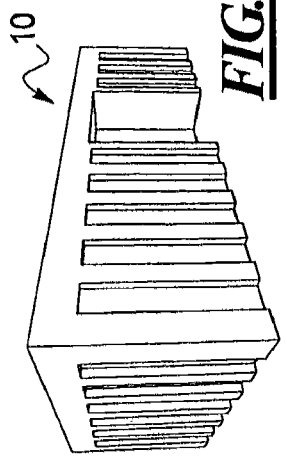
FIG. 2 is a schematic illustration of a building.

While the present disclosure is susceptible of various modifications and alternative constructions, certain illustrative embodiments thereof will be shown and described below in detail. It should be understood, however, that there is no intention to be limited to the specific embodiments disclosed, but on the contrary, the intention is to cover all modifications, alternative constructions, and equivalents falling within the spirit and scope of the present disclosure.

DETAILED DESCRIPTION OF THE DRAWINGS

Referring now to the drawings, embodiments of model-based estimation are provided for improving operation, monitoring, and/or control of temperature controlled systems. In one embodiment, a thermodynamic model of a zone in a building is used in conjunction with an Extended Kalman Filter (EKF) to estimate a heating/cooling load (e.g., internal load) of the zone. Multiple estimated loads over time may be used to generate an estimated load profile, which in turn may be used in energy simulation programs or for diagnostics. In another embodiment, a thermodynamic model of a cold room is used in conjunction with an EKF to estimate a temperature of goods stored in the cold room. The EKF may also estimate some unknown parameters that may be used in the thermodynamic model to generate a predicted air temperature of the cold room. The predicted air temperature may be compared with an actual measured temperature of the cold room to determine whether a triggered alarm condition is true or false.

Figure 3:
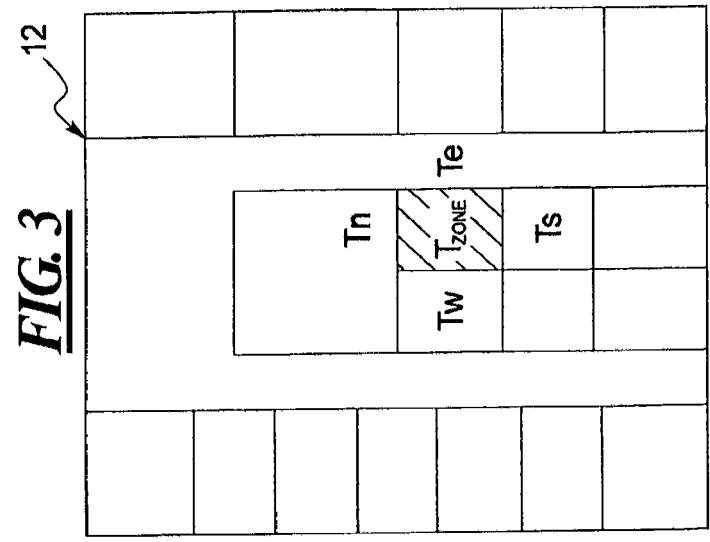
FIG. 3 is a schematic illustration of a floor of the building of FIG. 2.
Figure 1:
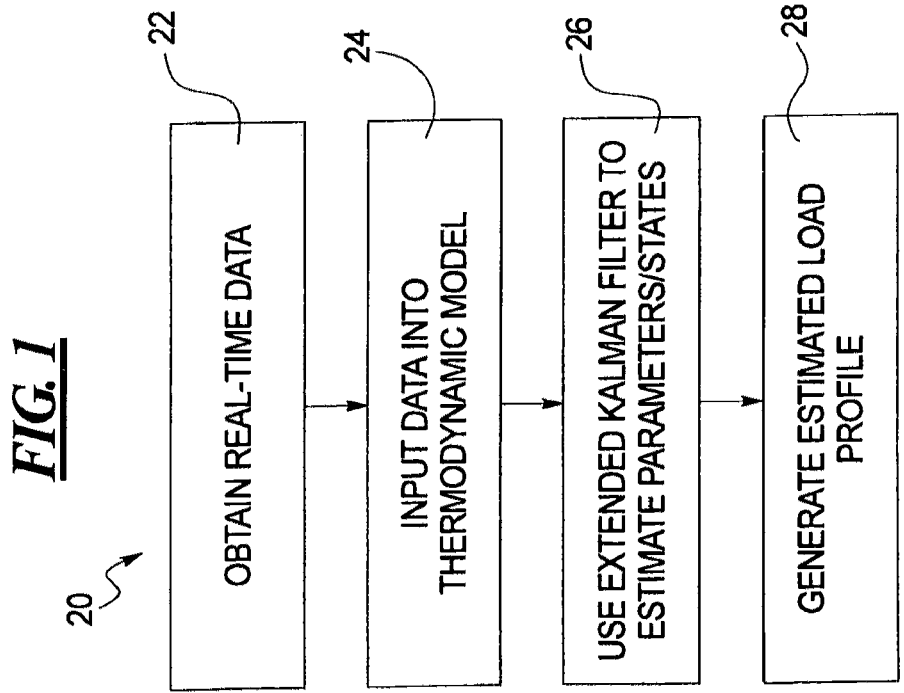
FIG. 1 is a schematic block diagram of a model-based method of estimating load in a building.

FIG. 1 schematically illustrates a method 20 for estimating real time load in a zone of a building. The zone to which the method is applied may be scaled. That is, the zone may be defined as a single room within the building, a group of rooms, an entire floor, or the entire interior space of the building. The method may further be simultaneously applied to multiple different zones within the same building. For example, a building 10 is schematically illustrated in FIG. 2, while a floor 12 of the building 10 is illustrated in FIG. 3. An interior zone $T_{zone}$, is located on the floor 12 of the building 10. In the illustrated embodiment, the interior zone $T_{zone}$ is surrounded by four neighboring zones, a north neighboring zone $T_n$, an east neighboring zone $T_e$, a south neighboring zone $T_s$, and a west neighboring zone $T_w$. The method 20 may be used to estimate real time load in the interior zone $T_{zone}$, of the building 10.

Returning to FIG. 1, at block 22, real time data is provided by various sensors, such as temperature sensors and airflow sensors, provided in the zone. The sensors may be provided as part of an HVAC system used to control temperature and other air qualities in the zone. Accordingly, the real time data may be taken from a Building Management System (BMS) or similar system provided to control the HVAC system. The real time data may include temperature, airflow rate, or other qualities that may be directly measured. A plurality of the same type of sensor may be used in the neighboring zones to measure a parameter at different areas within the building. For example, multiple temperatures sensors may be provided, such as at north, south, east and west neighboring zones within the building, to provide temperature data at those multiple positions.

Figure 4:
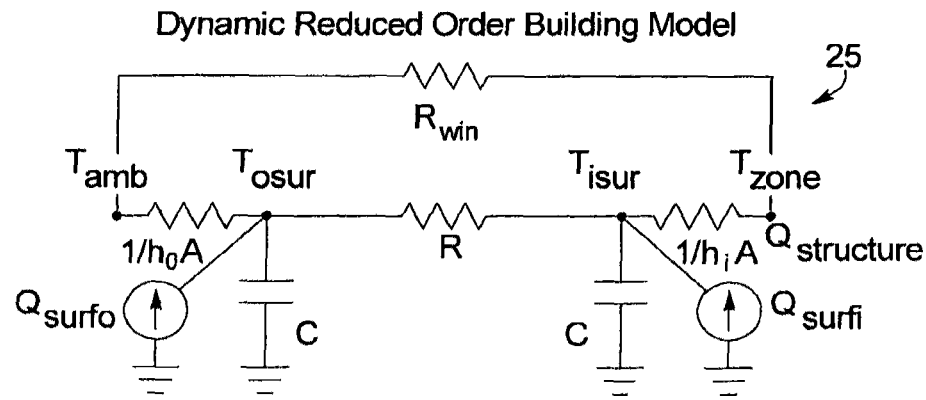
FIG. 4 is a schematic illustration of a building thermodynamic model that may be used in the method illustrated in FIG. 1.

The real time data is input into a reduced order thermodynamic model of the building zone at block 24. An exemplary low order state space thermodynamic model 25, which may be employed within the block 24 and may be based on non-linear algebraic and differential equations, is schematically shown in FIG. 4. The model 25 uses a number of parameters, such as ambient temperature $T_{amb}$, zone well-mixed air temperature $T_{zone}$, internal surface convective heat transfer coefficient $h_i$, external surface convective heat transfer coefficient $h_o$, and surface area A, that may be measurable or otherwise known. Other parameters and/or states used in the model 25 may be unknown, such as outside surface temperature $T_{osur}$, and inside surface temperature $T_{isur}$.

The thermodynamic model 25 may also be stated mathematically. The state space formation from the thermodynamics model 25 is illustrated below for the interior zone $T_{zone}$, assuming adiabatic boundary conditions for the floor and ceiling:

$$\dot{X} = f(X, U)$$
$$y = CX \qquad (1)$$

Where, $$f(X, U) = \qquad (2)$$

$$\begin{bmatrix} \left(-\dfrac{u_1}{m_{air}} - \dfrac{(h_i A_w + h_i A_n + h_i A_e + h_i A_s)}{m_{air} C_{pa}}\right) x_1 + \dfrac{h_i A_w}{m_{air} C_{pa}} x_3 + \\ \dfrac{h_i A_n}{m_{air} C_{pa}} x_5 + \dfrac{h_i A_e}{m_{air} C_{pa}} x_7 + \dfrac{h_i A_s}{m_{air} C_{pa}} x_9 + \dfrac{x_{10}}{m_{air} C_{pa}} + \dfrac{u_1 u_2}{m_{air}} \\ -\left(\dfrac{h_o A_w}{C_w} + \dfrac{1}{R_w C_w}\right) x_2 + \dfrac{1}{R_w C_w} x_3 + \dfrac{h_o A_w u_3}{C_w} \\ \dfrac{h_i A_w}{C_w} x_1 + \dfrac{1}{R_w C_w} x_2 - \left(\dfrac{h_i A_w}{C_w} + \dfrac{1}{R_w C_w}\right) x_3 \\ -\left(\dfrac{h_o A_n}{C_n} + \dfrac{1}{R_n C_n}\right) x_4 + \dfrac{1}{R_n C_n} x_5 + \dfrac{h_o A_n u_4}{C_n} \\ \dfrac{h_i A_n}{C_n} x_1 + \dfrac{1}{R_n C_n} x_4 - \left(\dfrac{h_i A_n}{C_n} + \dfrac{1}{R_n C_n}\right) x_5 \\ -\left(\dfrac{h_o A_e}{C_e} + \dfrac{1}{R_e C_e}\right) x_6 + \dfrac{1}{R_e C_e} x_7 + \dfrac{h_o A_e u_5}{C_e} \\ \dfrac{h_i A_e}{C_e} x_1 + \dfrac{1}{R_e C_e} x_6 - \left(\dfrac{h_i A_e}{C_e} + \dfrac{1}{R_e C_e}\right) x_7 \\ -\left(\dfrac{h_o A_s}{C_s} + \dfrac{1}{R_s C_s}\right) x_8 + \dfrac{1}{R_s C_s} x_9 + \dfrac{h_o A_s u_6}{C_s} \\ \dfrac{h_i A_s}{C_s} x_1 + \dfrac{1}{R_s C_s} x_8 - \left(\dfrac{h_i A_s}{C_s} + \dfrac{1}{R_s C_s}\right) x_9 \\ 0 \end{bmatrix}$$

$U=[u_1\ u_2\ u_3\ u_4\ u_5\ u_6]=[\dot{m}_{sa}\ T_{sa}\ T_w\ T_n\ T_e\ T_s]$ is the input vector and $y=T_{zone}(t)$ is the history of room temperature from sensor measurements. The state vector is:

$$X = \begin{bmatrix} x_1 \\ x_2 \\ x_3 \\ x_4 \\ x_5 \\ x_6 \\ x_7 \\ x_8 \\ x_9 \\ x_{10} \end{bmatrix} = \begin{bmatrix} T_{zone} \\ T_{ow} \\ T_{iw} \\ T_{on} \\ T_{in} \\ T_{oe} \\ T_{ie} \\ T_{os} \\ T_{is} \\ Q_{int} \end{bmatrix} \qquad (3)$$

Where,
$T_{zone}$: Zone well mixed air temperature [° C.];
$T_w$: West neighboring zone air temperature [° C.];
$T_n$: North neighboring zone air temperature [° C.];
$T_e$: East neighboring zone air temperature [° C.];
$T_s$: South neighboring zone air temperature [° C.];
$T_{ow}$: West wall outside surface temperature [° C.];
$T_{iw}$: West wall inside surface temperature [° C.];
$T_{on}$: North wall outside surface temperature [° C.];
$T_{in}$: North wall inside surface temperature [° C.];
$T_{oe}$: East wall outside surface temperature [° C.];
$T_{ie}$: East wall inside surface temperature [° C.];
$T_{os}$: South wall outside surface temperature [° C.];
$T_{is}$: South wall inside surface temperature [° C.];
$Q_{int}$: The lumped load including all equipment load, lighting load and people load (convective part), infiltration load, and load due to interzone air mixing [W],
$A_j$: The surface area [m²], j∈(w, n, e, s) is the index for surrounding zones: west, north, east and west;

$h_i$: The internal surface convective heat transfer coefficient [W/m$^2$·° C.];

$h_o$: The external surface convective heat transfer coefficient [W/m$^2$·° C.];

$\dot{m}_{air}$: The supply air mass flow rate [kg/s];

$m_{air}$: The air mass for the given zone [kg];

$T_{sa}$: The supply air temperature [° C.]; and $C_{pa}$: The specific heat capacity of dry air [J/kg·° C.].

Returning back to FIG. 1, the results from the thermodynamic model 25 are then input into block 26 where an Extended Kalman Filter (EKF) 27 can be used to estimate unknown states in the process, such as loads. The EKF 27 may also estimate one or more unknown parameters and/or states used in the thermodynamic model, such as unmeasured surface temperatures. The uncertainty of real time data may be considered during design of the EKF 27.

Figure 5:
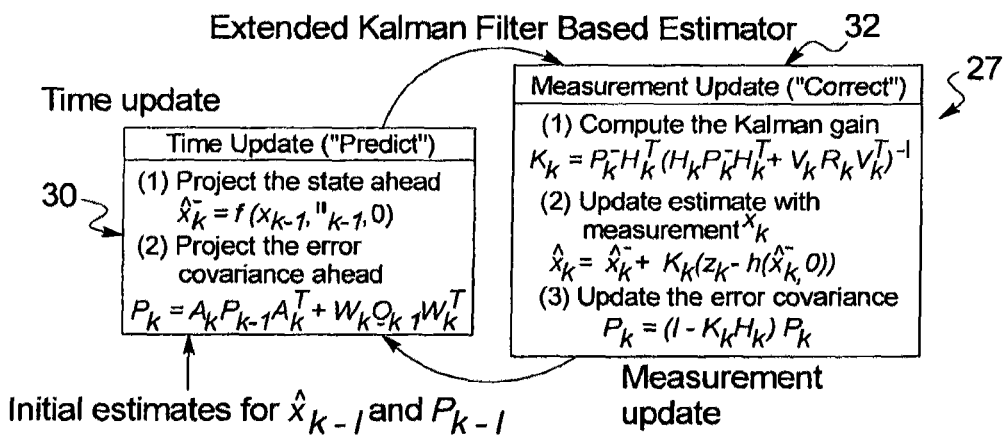
FIG. 5 is a schematic illustration of a time update and a measurement update that may be performed by a Extended Kalman Filter based estimator.

A schematic representation of the EKF 27 is illustrated in FIG. 5. In the illustrated embodiment, the EKF 27 can include a time update 30 and a measurement update 32. In the time update 30, initial estimates of the unknown state and an error covariance are provided from the thermodynamic model 25 at time k−1. Based on the initial estimates, a predicted unknown state and a predicted error covariance at time k are generated. In the measurement update, a measured parameter is used to update the predicted unknown state and error covariance. First, a Kalman gain is computed. The predicted unknown state is then updated with the computed Kalman gain and the measured parameter. The predicted error covariance is also updated using the computed Kalman gain. The updated predicted unknown state and the updated predicted error covariance are then fed back to the time update 30, thereby to refine the thermodynamic model.

In an exemplary embodiment, the measured parameter may be a measured air temperature from the zone. The thermodynamic model 25 and EKF 27 may be used to estimate unknown parameters, such as unmeasured room surface temperatures. Additionally, the model 25 and EKF 27 may be used to estimate unknown states of the zone, such as loads.

Figure 6:
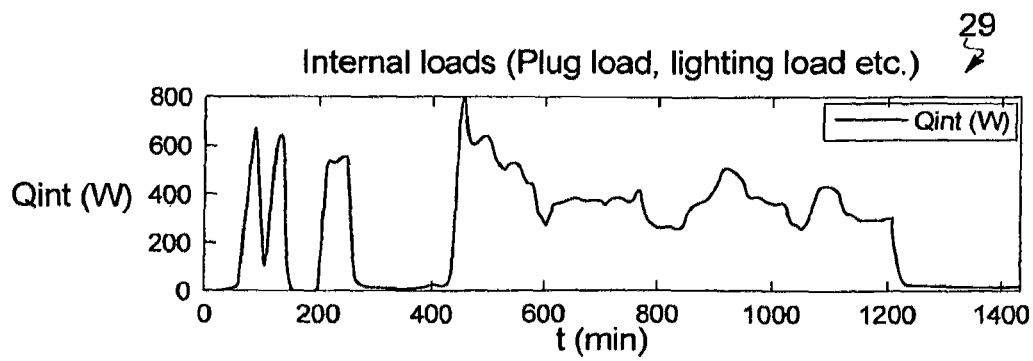
FIG. 6 is a graphical representation of an internal load profile of a building obtained from the method illustrated in FIG. 1.

At block 28, an estimated load profile 29 may be generated based on multiple load estimates taken over time. As shown in greater detail in FIG. 6, the estimated load profile 29 may chart a load, such as lumped load $Q_{int}$, over a period of time, such as a day. The estimated load profile 29 may provide various types of information either directly or inferentially. For example, the estimated load profile 29 may facilitate a better understanding of building usage, such as occupancy, plug loads, lighting loads, and process loads, in a dynamic environment.

The estimated load profile 29 may further enable refinements to existing processes, such as building energy monitoring, diagnostic, or control tools. Building energy monitoring tools include energy simulation programs, such as the EnergyPlus® program provided by the U.S. Department of Energy, which may be used to simulate building energy use over time. The estimated load profile 29 may be provided as an input load profile to such an energy simulation program, thereby to provide a more accurate estimate of energy usage in a building. The estimated load profile 29 may also be used in a building energy diagnostics tool or program to determine faults or alarm conditions. The estimated load profile 29 may indicate load anomalies, such as an unexpectedly large load during a period of the day when such a load would not normally be encountered. The load anomaly may be used to generate an alarm to check for localized faults, such as envelope leaks or light usage when the building is unoccupied. The estimated load profile 29 may additionally or alternatively be used in building energy control tools or software used to operate the temperature control equipment.

A controller, such as an HVAC controller 51 (See FIG. 7), may be provided for performing one or more steps of the method 20. The HVAC controller 51 may include a memory for storing the reduced order thermodynamic model 25, the Extended Kalman filter 27, and other data or algorithms. The HVAC controller 51 may further be operatively coupled to sensors or other inputs to provide the measured parameter or other data. The HVAC controller 51 may further be programmed to process the measured parameter using the Extended Kalman Filter 27 to estimate the at least one unknown state of the zone.

Figure 7:
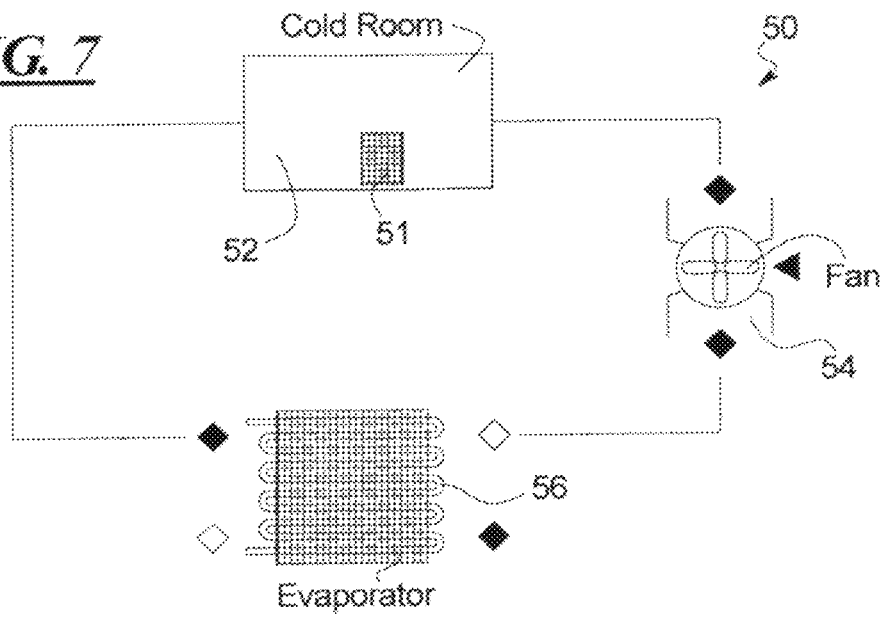
FIG. 7 is a schematic illustration of a cold room of a supermarket refrigeration system.

The model-based estimation may also be applied in other applications, such as in a supermarket refrigeration system 50 schematically illustrated in FIG. 7. The refrigeration system 50 may include a cold room 52 for storing goods, and a fan 54 and evaporator 56 operatively coupled to the cold room for maintaining the room at a desired temperature. The temperature of the cold room 52 may be monitored to make sure it keeps the goods below a threshold temperature. Notwithstanding the fact that the HVAC controller 51 is shown as being part of the cold room 52, it will be understood that such an illustration is merely exemplary. In other embodiments, the HVAC controller 51 may be employed in combination or conjunction with the cold room 52 (or the building itself) in other configurations.

Figure 8:
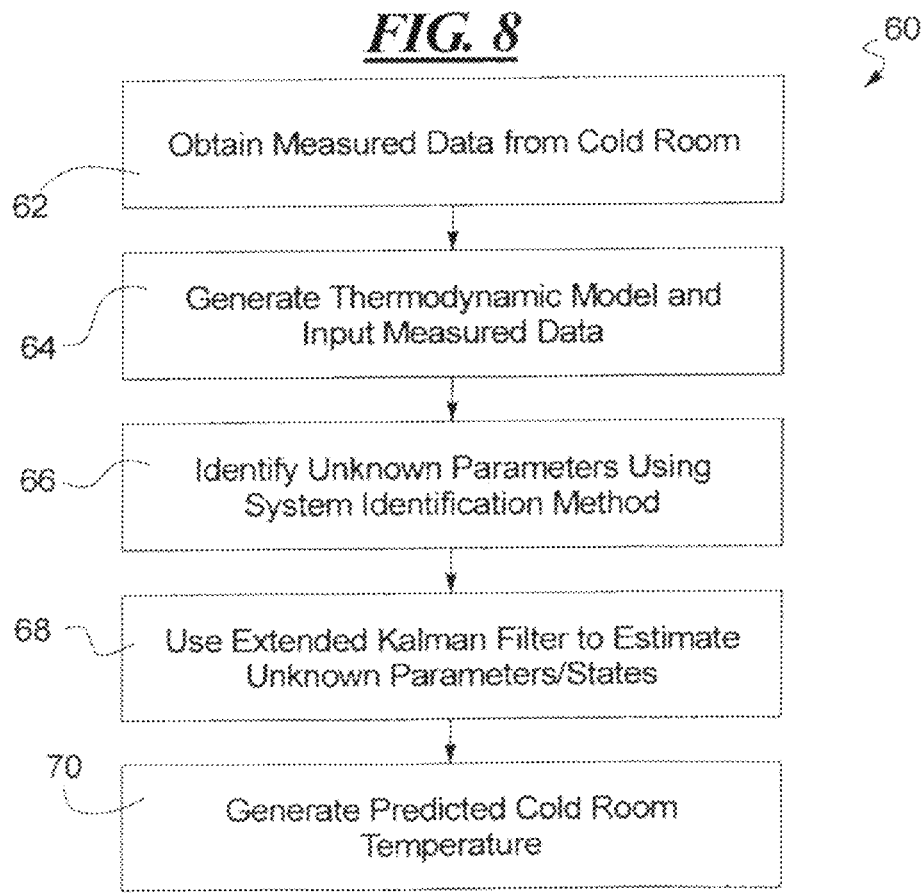
FIG. 8 is a schematic block diagram of a model-based method of predicting an air temperature in a cold room of a supermarket refrigeration system.

FIG. 8 schematically illustrates a method 60 for estimating states and predicting temperatures in the cold room 52. At block 62, measured data (alternatively referred to herein as "known parameters") are provided by one or more sensors, such as an air temperature sensor positioned in the cold room.

The measured data may be used in a reduced order thermodynamic model of the cold room at block 64. The thermodynamic model may be based on non-linear algebraic and differential equations, and may use a number of known parameters, such as the measured cold room air temperature $T_R$, and a number of unknown parameters, such as an infiltration load $Q_{in}$. The state space formation from thermodynamics model of the cold room may be stated mathematically as:

$$\dot{X} = f(X, U)$$

$$y = CX \quad (4)$$

Where, $$f(X,U) = \begin{bmatrix} H^*(T_{amb} - x_1) + \dfrac{u_f(t)}{x_2 + x_4}(u_T(t) - x_1) + Q_d^* u_d(t) + \\ x_5 u_{in}(t) + \dfrac{UA_{g-a}(x_3 - x_1)}{x_8} \\ x_6(1 - x_2)(1 - u_d(t)) + x_7 x_2 u_d(t) \\ -\dfrac{UA_{g-a}(x_3 - x_1)}{x_9} \\ 0 \\ 0 \\ 0 \\ 0 \\ 0 \\ 0 \end{bmatrix} \quad (5)$$

$U = \lfloor u_f(t)\ u_d(t)\ u_{in}(t)\ u_T(t) \rfloor$ is input vector and $y = T_R(t)$ is the history of room temperature from sensor measurements. The state vector is $$X = \begin{pmatrix} x_1 \\ x_2 \\ x_3 \\ x_4 \\ x_5 \\ x_6 \\ x_7 \\ x_8 \\ x_9 \end{pmatrix} = \begin{bmatrix} T_R \\ R^* \\ T_{goods} \\ R_c^* \\ Q_{in}^* \\ a_g \\ b_g \\ M_{air} \\ M_{goods} \end{bmatrix} \quad (6)$$

Where, $u_f$: Fan status ON/OFF (1 or 0);
$u_d$: Defrosting status ON/OFF (1 or 0);
$u_{in}$: Door status OPEN/CLOSE (1 or 0);
$u_T$: Evaporator coil surface temperature [° C.];
$T_R$: Cold room air temperature [° C.];
$T_{goods}$: Goods temperature [° C.];
R: Ice thermal resistance [m$^{2 \cdot \circ}$ C./W], with $a_g \cdot (1-R) > 0$ being a growth rate when defrosting is off and $b_g \cdot R < 0$ being a decay rate when defrosting is active;
$R_c$: Air side thermal resistance [m$^{2 \cdot \circ}$ C./W];
$Q_{in}$: Infiltration load [W];
U: Overall heat transfer coefficient between goods and air [W/m$^{2 \cdot \circ}$ C.];
$M_{air}$: Thermal mass of the air in the cold room [J/° C.];
$M_{goods}$: Thermal mass of the goods in the cold room [J/° C.].

At block 66, one or more of the unknown parameters may be identified using a system identification method. External influences on the system behavior (which may be considered inputs to the system) are identified from measurement data and the dynamic model at the block 64. In this process, sensor measurement data, including cold room temperature, fan status, defrosting status, and door status, are needed to identify unknown parameters such as lumped parameter H* (related to overall cold room surface heat transfer coefficient and cold room surface area), and Qd* (the energy input during defrosting).

At block 68, an Extended Kalman Filter (EKF) (such as the EKF 27) based on the thermodynamic model is used to estimate unknown states and unknown parameters of the cold room. The unknown states may include a temperature of the goods $T_{goods}$ in the cold room, while the unknown parameters may include $R_c$ (air side thermal resistance of the evaporator coil 56), $Q_{in}$ (infiltration load), $a_g$ (a parameter indicating ice growth rate on the evaporator coil 56), and $b_g$ (a parameter indicating ice decay rate on the evaporator coil 56). The uncertainty of real time data may be considered during design of the EKF. As with the previous embodiment, the EKF may include time update and measurement update components. With the estimated unknown parameters from the EKF, the thermodynamic model may then be used to generate a predicted room temperature, as shown at block 70.

The estimated states, such as the estimated goods temperature $T_{goods}$, and the predicted room temperature may be used for monitoring, diagnostics, or other purposes. By providing an estimated goods temperature $T_{goods}$, the method allows monitoring personnel to automatically diagnose the root cause of a temperature alarm, such as when warmer goods are brought into the cold room, without requiring a call or other query to the store to ask for that information. Additionally, the predicted temperature may be compared to measured real-time data, such as the cold room temperature $T_R$, to determine whether an alarm condition is true or false. For example, when the predicted and actual room temperatures converge, the alarm may be false, whereas when they diverge, the alarm may be true.

A controller, such as a cold room controller (e.g., the HVAC controller 51), may be provided for performing one or more steps of the method 60. The cold room controller may include a memory for storing the reduced order thermodynamic model of the cold room, the Extended Kalman Filter, and other data or algorithms. The cold room controller may further be operatively coupled to sensors or other inputs to provide the measured parameters, information regarding the unknown parameters, or other data. The cold room controller may further be programmed to process the measured parameter using the Extended Kalman Filter to obtain the estimated unknown state of the cold room and the estimated unknown parameter of the cold room.

It will be apparent to those skilled in the art that various modifications and variations can be made in the disclosed model-based estimating systems and methods without departing from the scope of the disclosure. Embodiments other than those specifically disclosed herein will be apparent to those skilled in the art from consideration of the specification and practice of the systems and methods disclosed herein. It is intended that the specification and examples be considered as exemplary only, with a true scope of the disclosure being indicated by the following claims and their equivalents.

What is claimed is:

1. A method for estimating an internal load of a zone within a building, comprising:
    determining a measured state from the zone, the measured state being at least one measured air temperature within the zone;
    generating a reduced order thermodynamic model of the zone;
    generating an Extended Kalman Filter based on the thermodynamic model of the zone; and
    processing the measured state using the Extended Kalman Filter to estimate at least one unknown state of the zone, the at least one unknown state being the internal load of the zone.

2. The method of claim 1, in which the Extended Kalman Filter includes a time update, in which the thermodynamic model provides an estimated state and an estimated error covariance at a future time, and a measurement update, in which a Kalman gain is computed, the estimated state is updated with the measured state and the Kalman gain, and the estimated error covariance is updated with the Kalman gain.

3. The method of claim 1, in which the at least one unknown state is an estimated lumped internal load of the zone.

4. The method of claim 3, in which the estimated lumped internal load includes at least one of an estimated equipment load, an estimated lighting load, an estimated people load, an estimated infiltration load, and an estimated interzone mixing load.

5. The method of claim 3, in which the at least one unknown state further includes at least one estimated surface temperature associated with the zone.

6. The method of claim 3, further comprising developing an internal load profile for the zone based on multiple estimated lumped loads provided over a period of time.

7. The method of claim 6, further comprising providing the internal load profile as an input load profile to an energy simulation program.

8. The method of claim 1, further comprising providing an HVAC controller having a memory for storing the reduced order thermodynamic model and the Extended Kalman filter, and wherein the HVAC controller is programmed to process the measured state using the Extended Kalman Filter to estimate the at least one unknown state of the zone.

9. A method for estimating a temperature in a cold room of a refrigeration system, comprising:
- determining a measured state from the cold room, the measured state being at least one measured air temperature within the cold room;
- generating a reduced order thermodynamic model of the cold room, the thermodynamic model including at least one unknown parameter;
- identifying the at least one unknown parameter of the thermodynamic model using a system identification method and sensor measurement data, the at least one unknown parameter including a lumped parameter H* related to overall cold room surface heat transfer coefficient and cold room surface area and Qd* related to energy input during defrosting;
- generating an Extended Kalman Filter based on the thermodynamic model of the cold room; and
- processing the measured state using the Extended Kalman Filter to obtain an estimated unknown state of the cold room, the estimated unknown state of the cold room being a temperature of the goods and to obtain an estimated unknown parameter of the cold room to generate a predicted cold room temperature, the estimated unknown parameter of the cold room including an infiltration load, an air side thermal resistance of an evaporator coil and ice growth and decay rate on the evaporator coil.

10. The method of claim 9, further comprising generating the predicted cold room temperature using the thermodynamic model and the estimated unknown parameter of the cold room.

11. The method of claim 10, in which the predicted cold room temperature is compared to a measured cold room temperature to determine whether an alarm condition exists.

12. The method of claim 9, further comprising providing a cold room controller having a memory for storing the reduced order thermodynamic model of the cold room and the Extended Kalman Filter, and wherein the cold room controller is programmed to process the measured state using the Extended Kalman Filter to obtain the estimated unknown state of the cold room and the estimated unknown parameter of the cold room.

* * * * *